(12) United States Patent
Oe et al.

(10) Patent No.: US 11,687,584 B2
(45) Date of Patent: *Jun. 27, 2023

(54) METHOD OF GENERATING LOG DATA, NON-TRANSITORY COMPUTER-READABLE MEDIUM, AND DATA STRUCTURE

(71) Applicant: TOYOTA JIDOSHA KABUSHIKI KAISHA, Toyota (JP)

(72) Inventors: Yoshihiro Oe, Kawasaki (JP); Kazuya Nishimura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 176 days.

This patent is subject to a terminal disclaimer.

(21) Appl. No.: 17/192,168

(22) Filed: Mar. 4, 2021

(65) Prior Publication Data

US 2021/0192276 A1   Jun. 24, 2021

Related U.S. Application Data

(63) Continuation of application No. 16/440,267, filed on Jun. 13, 2019, now Pat. No. 10,977,517.

(30) Foreign Application Priority Data

Sep. 5, 2018   (JP) .................................. 2018-166253

(51) Int. Cl.
*G06F 16/58* (2019.01)
*G06V 20/56* (2022.01)
(Continued)

(52) U.S. Cl.
CPC .......... *G06F 16/5866* (2019.01); *G06F 16/51* (2019.01); *G06F 16/53* (2019.01);
(Continued)

(58) Field of Classification Search
None
See application file for complete search history.

(56) References Cited

U.S. PATENT DOCUMENTS

| 9,589,181 B2* | 3/2017 | Ito ........................ G06V 40/173 |
| 9,665,798 B2* | 5/2017 | Watanabe ............. G06F 18/211 |

(Continued)

FOREIGN PATENT DOCUMENTS

| JP | 3012677 B2 | 2/2000 |
| JP | 2008-187328 A | 8/2008 |
| JP | 2011-198268 A | 10/2011 |

OTHER PUBLICATIONS

Dec. 17, 2020 Notice of Allowance issued in U.S. Appl. No. 16/440,267.

*Primary Examiner* — Tsung Yin Tsai
(74) *Attorney, Agent, or Firm* — Oliff PLC

(57) ABSTRACT

A method of generating log data that includes a plurality of records, in which information detected through image recognition processing on a plurality of image frames is recorded. The method includes, detecting objects in each image frame through the image recognition processing, generating a record including identification information of each image frame and the aggregated number of objects detected in the image frame for each image frame, and adding metadata relating to the detected objects to the corresponding record when the aggregated number of objects is equal to or greater than one. When the aggregated number of objects is zero, the metadata related to the detected objects is not added to the record.

20 Claims, 11 Drawing Sheets

(51) Int. Cl.
  *G06V 20/58* (2022.01)
  *G06F 16/53* (2019.01)
  *G06F 16/51* (2019.01)
  *G06F 18/28* (2023.01)
  *G06F 18/2431* (2023.01)
  *G06V 20/70* (2022.01)

(52) U.S. Cl.
  CPC .......... *G06F 18/2431* (2023.01); *G06F 18/28* (2023.01); *G06V 20/56* (2022.01); *G06V 20/58* (2022.01); *G06V 20/70* (2022.01); *G06V 20/582* (2022.01); *G06V 2201/10* (2022.01)

(56) References Cited

U.S. PATENT DOCUMENTS

| | | | |
|---|---|---|---|
| 2008/0180525 A1 | 7/2008 | Kanehira et al. | |
| 2009/0129683 A1 | 5/2009 | Nitta | |
| 2011/0235900 A1* | 9/2011 | Porikli | G06F 16/51 |
| | | | 382/159 |
| 2011/0235926 A1 | 9/2011 | Yokono | |
| 2016/0012280 A1* | 1/2016 | Ito | G06V 40/173 |
| | | | 382/305 |
| 2017/0109391 A1* | 4/2017 | Rosen | G06F 16/7867 |

* cited by examiner

FIG. 8

| | A | B | C | D | E | F | G | H | I | J | K | L | M | N | O | P | Q | R | S | T | U | V | W | X | Y |
|---|---|---|---|---|---|---|---|---|---|---|---|---|---|---|---|---|---|---|---|---|---|---|---|---|---|
| 1 | 00000539 | 8-31-2016 05:03:17.357 | 6 | 2 | 0 | 0 | 0 | 0 | 1 | 0.00 | 0 | 0 | 662 | 319 | 42 | 55 | 3 | 2 | 1 | 39.5 | 93.9 | 11 | 0 | 0 | 320 |
| 2 | 00000540 | 8-31-2016 05:03:17.571 | 4 | 3 | 0 | 0 | 0 | 0 | 0 | 0.00 | 1 | 0 | 662 | 319 | 42 | 56 | 3 | 2 | 1 | 36.7 | 91.8 | 10 | 0 | -1 | 312 |
| 3 | 00000541 | 8-31-2016 05:03:17.857 | 3 | 2 | 1 | 0 | 0 | 0 | 0 | 0.00 | 1 | 0 | 662 | 319 | 42 | 56 | 3 | 2 | 1 | 36.7 | 94.0 | 10 | 0 | -1 | 300 |
| 4 | 00000542 | 8-31-2016 05:03:19.214 | 1 | 0 | 0 | 1 | 0 | 0 | 0 | 0.00 | 0 | 0 | 663 | 321 | 41 | 53 | 12 | 2 | 1 | 39.5 | 102.1 | 9 | -1 | -1 | |
| 5 | 00000543 | 8-31-2016 05:03:19.457 | 0 | 0 | 0 | 0 | 0 | 0 | 0 | | | | | | | | | | | | | | | | |
| 6 | 00000544 | 8-31-2016 05:03:20.433 | 2 | 2 | 0 | 0 | 0 | 0 | 0 | 0.00 | 1 | 0 | 665 | 401 | 10 | 30 | 1 | 1 | 0 | 70.1 | 92.1 | 1 | 1 | -1 | 231 |
| ... | | | | | | | | | | | | | | | | | | | | | | | | | |

FIG. 10

| No | RANGE OF FRAME IDENTIFICATION NUMBER | ARRANGEMENT SEQUENCE OF OBJECTS |
|---|---|---|
| 1 | 00000001 TO 00099999 | abcdefghijklmnopqrstuvwxyz |
| 2 | 00100001 TO 00199999 | abdcefghijklmnopqrstuvwxyz |
| 3 | 00200001 TO 00299999 | badcefghijklmnopqrstuvwxyz |
| ... | ... | ... |

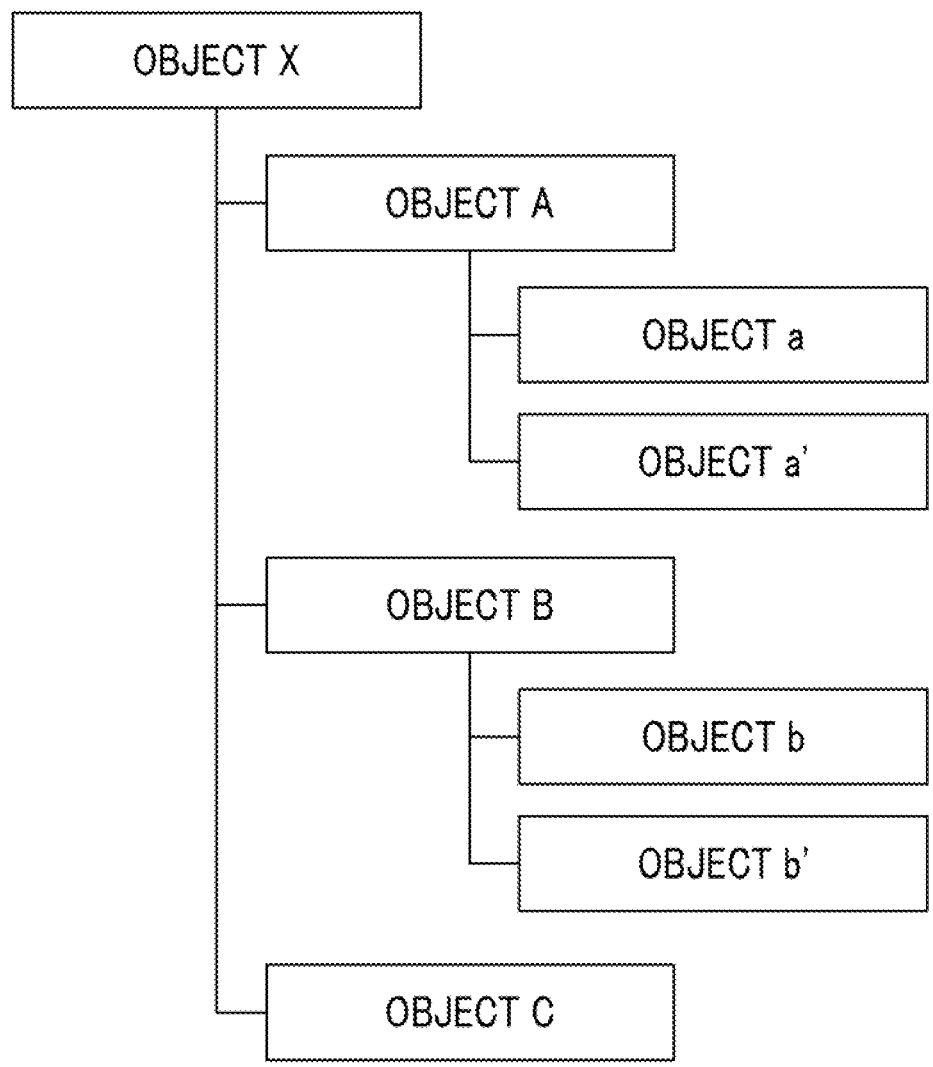

METHOD OF GENERATING LOG DATA, NON-TRANSITORY COMPUTER-READABLE MEDIUM, AND DATA STRUCTURE

INCORPORATION BY REFERENCE

This application is a continuation of U.S. patent application Ser. No. 16/440,267, filed Jun. 13, 2019, which claims priority to Japanese Patent Application No. 2018-166253 filed on Sep. 5, 2018 including the specification, drawings and abstract is incorporated herein by reference in its entirety.

BACKGROUND

1. Technical Field

The disclosure relates to a method of generating log data, a non-transitory computer-readable medium storing a program that causes processing to be executed, and a data structure.

2. Description of Related Art

In the related art, a technique that increases a speed of search for information included in data is known. For example, Japanese Patent No. 3012677 discloses a technique that rearranges a search sequence of the subsequences according to the number of searches regarding registered subsequences in dictionary data in order to increase a speed of search of dictionary data to be used in encoding.

SUMMARY

There is a need to increase a speed of search processing of log data of image recognition processing on video captured by an in-vehicle camera or the like. In general, a long time is taken for the search processing due to the expansion of a data size or the like of the log data of the image recognition processing. For this reason, there is room for improvement on an information search technique of the log data of the image recognition processing.

The disclosure provides a method of generating log data, a non-transitory computer-readable medium storing a program that causes processing to be executed, and a data structure for improving an information search technique of log data of image recognition processing.

A first aspect of the disclosure relates to a method of generating log data including a plurality of records, in which information detected through image recognition processing on a plurality of image frames is recorded. The method includes detecting objects in each image frame through the image recognition processing, generating, for each image frame, a record including identification information of a corresponding image frames and the aggregated number of objects detected in the corresponding image frames, and adding metadata related to the detected objects to a corresponding record when the aggregated number of objects is equal to or greater than one. When the aggregated number of objects is zero, the metadata related to the detected objects is not added to the record.

The method according to the first aspect may further include adding the total number of objects for each object classification to the corresponding record when the aggregated number of objects is equal to or greater than one.

In the method according to the first aspect, a sequence of metadata in the log data may be determined based on at least one of a recognition frequency and a detection score of each object.

The method according to the first aspect may further include changing a sequence of metadata in the log data in a predetermined period based on at least one of a recognition frequency and a detection score of each object in the predetermined period, and recording information of the sequence in a sequence table.

The method according to the first aspect may further include measuring a search speed of the log data with a predetermined search query based on tag information included in the log data, and changing the tag information when the search speed is lower than a predetermined value.

In the method according to the first aspect, at least a part of object classifications may be hierarchized. Solely when a detection score of image recognition processing related to a higher hierarchical object classification is equal to or greater than a predetermined value, image recognition processing related to a lower hierarchical object classification of the higher hierarchical object classifications may be executed.

A second aspect of the disclosure relates to a non-transitory computer-readable medium storing a program that causes a computer functioning as an information processing device configured to generate log data including a plurality of records, in which information detected through image recognition processing on a plurality of image frames is recorded, to execute processing. The processing includes detecting objects in each image frame through the image recognition processing, generating, for each image frame, a record including identification information of a corresponding image frame and the aggregated number of objects detected in the corresponding image frame, and adding metadata related to the detected objects to a corresponding record when the aggregated number of objects is equal to or greater than one. When the aggregated number of objects is zero, the metadata related to the detected objects is not added to the record.

A third aspect of the disclosure relates to a data structure of log data including information detected through image recognition processing on a plurality of image frames. The data structure includes a plurality of records corresponding to the image frames. Each record includes identification information of a corresponding image frame and the aggregated number of objects detected in the corresponding image frames. A record in which the aggregated number of objects is equal to or greater than one includes metadata related to the detected objects, and a record in which the aggregated number of objects is zero includes no metadata.

A fourth aspect of the disclosure relates to a data structure of log data that is used in an information processing system including a vehicle and a server, and includes information detected through image recognition processing on a plurality of image frames. The data structure includes a plurality of records corresponding to the image frames. Each record includes identification information of a corresponding image frames and the aggregated number of objects detected in the corresponding image frames. The vehicle adds metadata related to the detected objects to the corresponding record when the aggregated number of objects is equal to or greater than one and adds no metadata when the aggregated number of objects is zero.

With the method of generating log data, the non-transitory computer-readable medium storing a program that causes processing to be executed, and the data structure according to the aspects of the disclosure, it is possible to improve an information search technique of log data of image recognition processing.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8 shows an example of generated log data;

FIG. 10 shows an example of a sequence table; and

FIG. 11 is a conceptual diagram representing the hierarchical relationship between objects to be detected.

DETAILED DESCRIPTION OF EMBODIMENTS

Hereinafter, an embodiment of the disclosure will be described.

Configuration of Information Processing System

Figure 1:
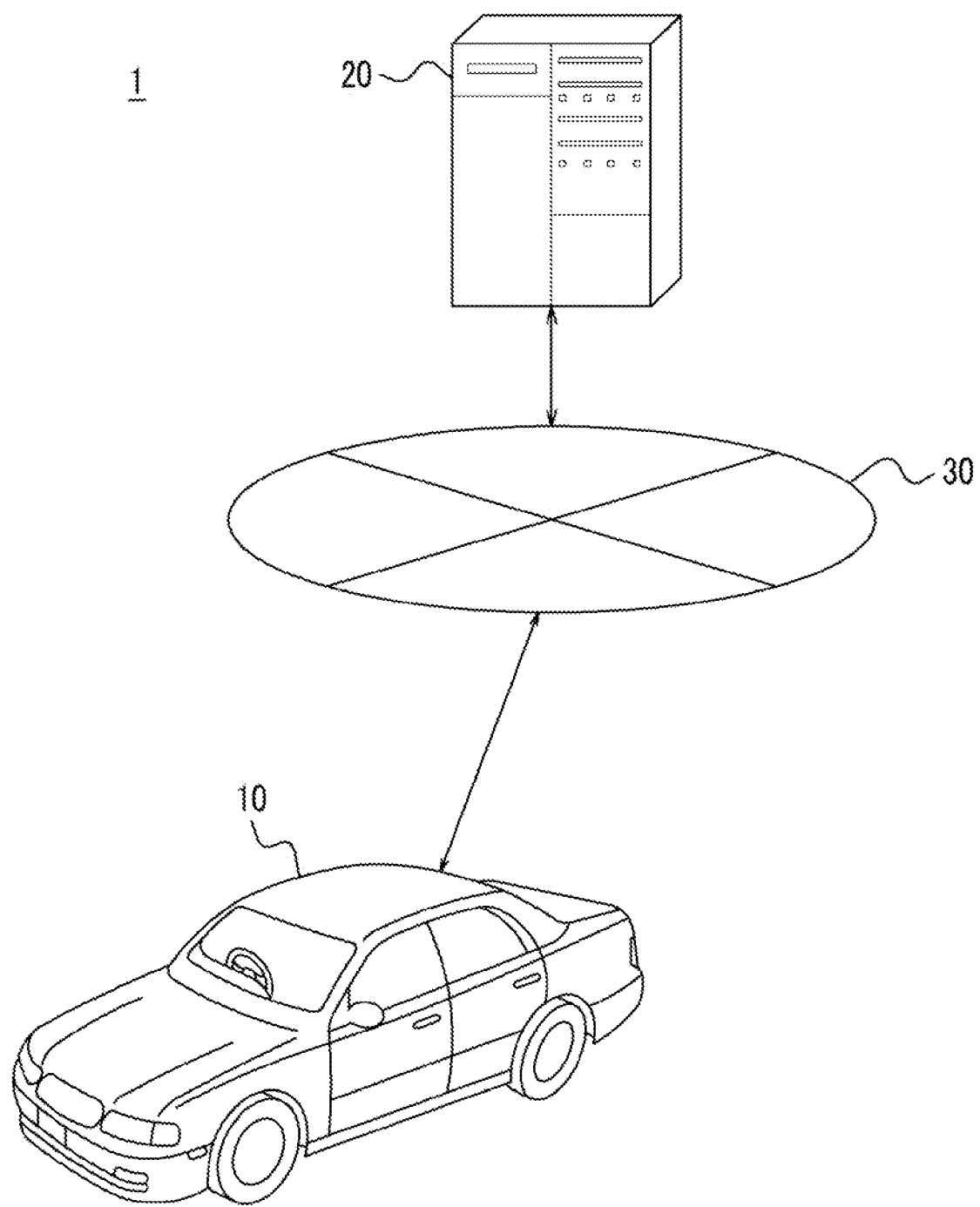
FIG. 1 is a diagram showing the schematic configuration of an information processing system according to an embodiment of the disclosure.

The outline of an information processing system 1 according to an embodiment of the disclosure will be described referring to FIG. 1. The information processing system 1 includes a vehicle 10 and a server 20. The vehicle 10 is, for example, an automobile; however, the vehicle 10 is not limited to an automobile and may be any vehicle. In FIG. 1, for simplification of description, solely one vehicle 10 is shown; however, the number of vehicles 10 in the information processing system 1 may be one or more. The server 20 includes one server device or a plurality of server devices that can perform communication with one another. The server 20 can perform communication with a client terminal through a network 30. In the embodiment, a client includes one or more vehicles 10. Accordingly, each vehicle 10 and the server 20 can perform communication through the network 30 including, for example, a mobile communication network, the Internet, and the like. However, the client that can perform communication with the server 20 is not limited to the vehicle 10, and may include, for example, any information processing device, such as a smartphone or a computer.

As the outline of the embodiment, image recognition processing is executed on a plurality of captured images (hereinafter, referred to as "image frames") obtained by the vehicle 10 imaging scenery outside the vehicle to generate log data. Each record of the log data includes the aggregated (hereinafter, referred to as "the aggregated number of objects") of objects detected through the image recognition processing. In a case where the aggregated number of objects is equal to or greater than one, detailed information (hereinafter, referred to as "metadata") related to each object is added to the record. In a case where the aggregated number of objects is zero, metadata is not added to the record.

In this way, according to the embodiment, in a case where the aggregated number of objects is equal to or greater than one, the metadata of the detected object is added to the log data, and in a case where the aggregated number of objects is zero, unneeded data is not added to the log data, whereby it is possible to suppress an increase in data size of the log data. An increase in data size of the log data to be searched is suppressed, whereby it is possible to improve a search speed and to improve an information search technique of the log data.

Configuration of Vehicle

Figure 2:
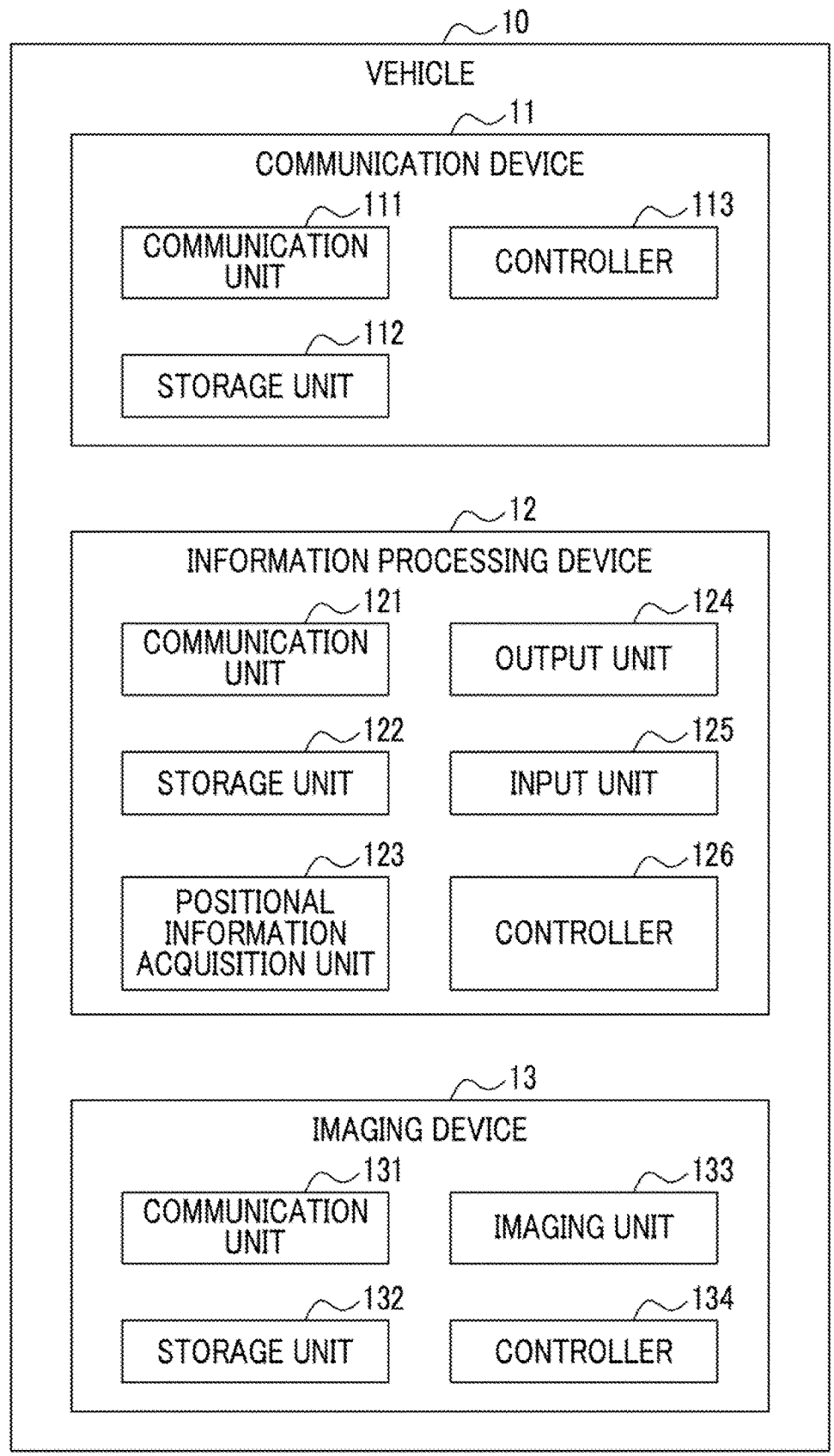
FIG. 2 is a block diagram showing the schematic configuration of a vehicle.

As shown in FIG. 2, the vehicle 10 includes a communication device 11, an information processing device 12, and an imaging device 13. The communication device 11 and the information processing device 12 are connected to perform communication with each other through an in-vehicle network, such as a controller area network (CAN), or a dedicated line.

The communication device 11 is, for example, in-vehicle communication equipment, such as a data communication module (DCM). Specifically, the communication device 11 includes a communication unit 111, a storage unit 112, and a controller 113.

The communication unit 111 includes a communication module that performs communication through the in-vehicle network or the dedicated line. The communication unit 111 includes a communication module that is connected to the network 30. For example, the communication unit 111 may include a communication module corresponding to a mobile communication standard, such as 4th Generation (4G) and 5th Generation (5G). In the embodiment, the vehicle 10 is connected to the network 30 through the communication unit 111.

The storage unit 112 includes one or more memories. In the embodiment, the "memory" is, for example, a semiconductor memory, a magnetic memory, an optical memory, or the like, but is not limited thereto. Each memory included in the storage unit 112 may function as, for example, a main storage device, an auxiliary storage device, or a cache memory. The storage unit 112 stores optional information that is used for the operation of the communication device 11. For example, the storage unit 112 may store a system program, an application program, identification information of the vehicle 10, and the like. The identification information of the vehicle 10 is information capable of uniquely identifying the vehicle 10 in the information processing system 1. When information is transmitted from the communication device 11 to the server 20, the identification information of the vehicle 10 is transmitted to the server 20 along with the above-described information, whereby the server 20 can identify the vehicle 10 as a transmission source. Identification information of the communication device 11 or the information processing device 12 in the vehicle 10 may be used as the identification information of the vehicle 10. Information stored in the storage unit 112 may be updated with, for example, information to be acquired from the network 30 through the communication unit 111.

The controller 113 includes one or more processors. In the embodiment, the "processor" is a general-purpose processor or a dedicated processor specific to specified processing, but is not limited thereto. The controller 113 controls the overall operation of the communication device 11. In the embodiment, the vehicle 10 and the server 20 perform communication through the communication device 11 that is controlled by the controller 113.

For example, the controller 113 acquires the log data related to the image frames obtained by imaging scenery outside the vehicle from the information processing device 12. The controller 113 transmits the acquired log data to the server 20. The log data may be transmitted each time each record is generated or may be transmitted after being accumulated in the storage unit 112 in a given period. The controller 113 may acquire the image frames from the imaging device 13 and may transmit the image frames to the server 20.

The information processing device 12 is, for example, a navigation device or an autonomous driving control device that is mounted in the vehicle 10, but is not limited thereto. Specifically, the information processing device 12 includes a communication unit 121, a storage unit 122, a positional information acquisition unit 123, an output unit 124, an input unit 125, and a controller 126.

The communication unit 121 includes a communication module that performs communication through the in-vehicle network or the dedicated line.

The storage unit 122 includes one or more memories. Each memory included in the storage unit 122 may function as, for example, a main storage device, an auxiliary storage device, or a cache memory. The storage unit 122 stores optional information that is used for the operation of the information processing device 12. For example, the storage unit 122 may store a system program, an application program, and the like. Information stored in the storage unit 122 may be updated with, for example, information to be acquired from the network 30 through the communication device 11.

The positional information acquisition unit 123 includes one or more receivers corresponding to any satellite positioning system. For example, the positional information acquisition unit 123 may include a global positioning system (GPS) receiver. The positional information acquisition unit 123 acquires positional information of the vehicle 10 and outputs the acquired positional information to the controller 126.

The output unit 124 includes one or more output interfaces that output information to notify a user of information. For example, the output interfaces included in the output unit 124 are a display that outputs information in a form of video, a speaker that outputs information in a form of sound, and the like, but are not limited thereto. For example, the display is a panel display, a head-up display, or the like, but is not limited thereto. In the embodiment, "video" may include text, a still image, and a moving image.

The input unit 125 includes one or more input interfaces that detect user input. For example, the input interfaces included in the input unit 125 is physical keys, capacitance type keys, a touch screen provided integrally with the panel display of the output unit 124, a microphone that receives sound input, and the like, but are not limited thereto.

The controller 126 includes one or more processors. The controller 126 controls the overall operation of the information processing device 12. For example, the controller 126 generates log data based on the positional information of the vehicle 10 acquired from the positional information acquisition unit 123 and the image frames acquired from the imaging device 13.

The imaging device 13 is a device that generates a plurality of image frames obtained by imaging a subject. In the embodiment, the imaging device 13 is provided in the vehicle 10 such that scenery outside the vehicle can be imaged. The imaging device 13 may be, for example, an in-vehicle camera that is used for driving assistance of the vehicle, a drive recorder, or the like. Specifically, the imaging device 13 includes a communication unit 131, a storage unit 132, an imaging unit 133, and a controller 134.

The communication unit 131 includes a communication module that performs communication through the in-vehicle network or the dedicated line.

The storage unit 132 includes one or more memories. Each memory included in the storage unit 132 may function as, for example, a main storage device, an auxiliary storage device, or a cache memory. The storage unit 132 stores optional information that is used for the operation of the imaging device 13. For example, the storage unit 132 may store a system program, an application program, and the like. Information stored in the storage unit 132 may be updated with, for example, information to be acquired from the network 30 through the communication device 11.

The imaging unit 133 includes an optical element, such as a lens, and an image sensor. In the embodiment, the "image sensor" is, for example, a complementary metal-oxide-semiconductor (CMOS) image sensor, a charge-coupled devices (CCD) image sensor, or the like, but is not limited thereto.

The controller 134 includes one or more processors. The controller 134 controls the overall operation of the imaging device 13.

For example, the controller 134 generates a plurality of image frames obtained by imaging scenery outside the vehicle 10 with the imaging unit 133 at a predetermined frame rate (for example, 60 fps), and outputs the image frames to the information processing device 12. The image frames may be output to the information processing device 12 each time each image frame is generated or may be output to the information processing device 12 after being accumulated in the storage unit 132 in a given period. The image frames may be output to the information processing device 12 as a moving image including the image frames. In other words, the controller 134 may output the image frames as a plurality of still image files (for example, JPG files) or may output the image frames as one moving image file (for example, an AVI file).

Configuration of Server

Figure 3:
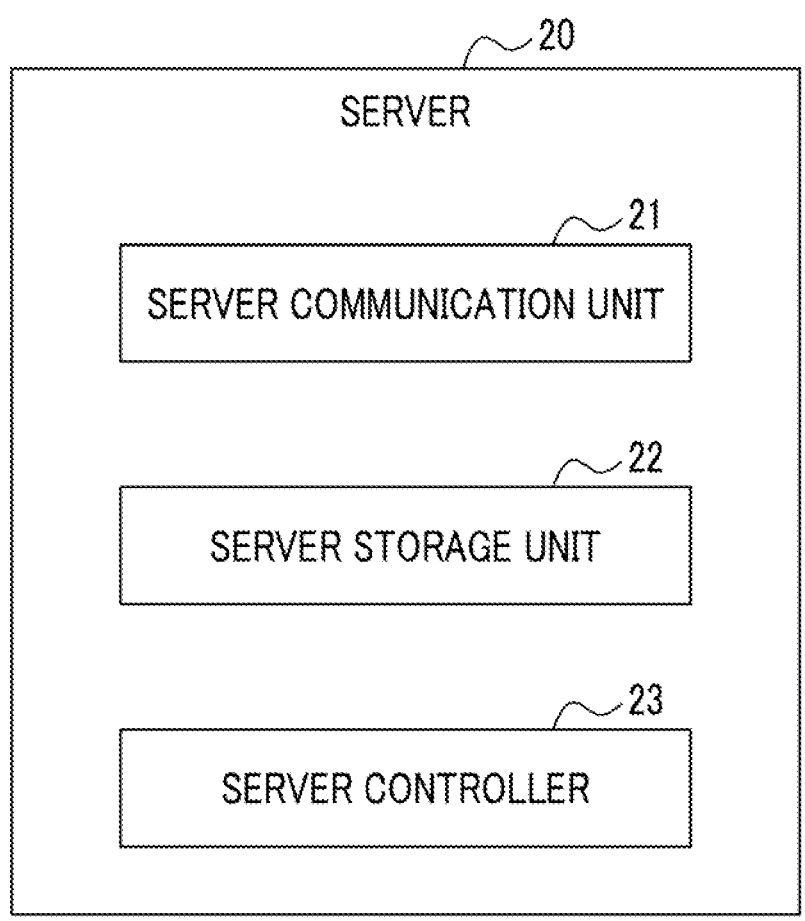
FIG. 3 is a block diagram showing the schematic configuration of a server.

As shown in FIG. 3, the server 20 includes a server communication unit 21, a server storage unit 22, and a server controller 23.

The server communication unit 21 includes a communication module that is connected to the network 30. For example, the server communication unit 21 may include a communication module corresponding to a wireless local area network (LAN) standard. In the embodiment, the server 20 is connected to the network 30 through the server communication unit 21.

The server storage unit 22 includes one or more memories. Each memory included in the server storage unit 22 may function as, for example, a main storage device, an auxiliary storage device, or a cache memory. The server storage unit 22 stores optional information that is used for the operation of the server 20. For example, the server storage unit 22 may store a system program, an application program, a database that stores the log data received from the vehicle 10, and the like. Information stored in the server storage unit 22 may be updated with, for example, information to be acquired from the network 30 through the server communication unit 21.

The server controller 23 shown in FIG. 3 includes one or more processors. The server controller 23 controls the overall operation of the server 20. For example, the server controller 23 receives and acquires the log data from the vehicle 10. The server controller 23 performs search processing of the log data based on a search query and outputs a search processing result. The search query is transmitted from the client terminal requesting the reference of the log data to the server 20 through the network 30. The search query includes information of any search condition designated by a keyword, a tag, and the like. Hereinafter, the structure of the log data for improving the search processing will be described.

Structure of Log Data

As described above, the log data is generated based on the image frames received from the imaging device 13 by the controller 126 of the information processing device 12 in the vehicle 10. The log data includes a plurality of records corresponding to the image frames. Specifically, the controller 126 detects objects in each image frame through the image recognition processing on each image frame. The controller 126 counts the aggregated number of objects. For each image frame, the controller 126 generates a record including identification information of the image frame and the aggregated number of objects detected in the image frame. In a case where the aggregated number of objects is equal to or greater than one, the controller 126 adds the total number (hereinafter, referred to as "the number of detections") of each object per object classification and the metadata related to each object to the corresponding record.

Figure 4:
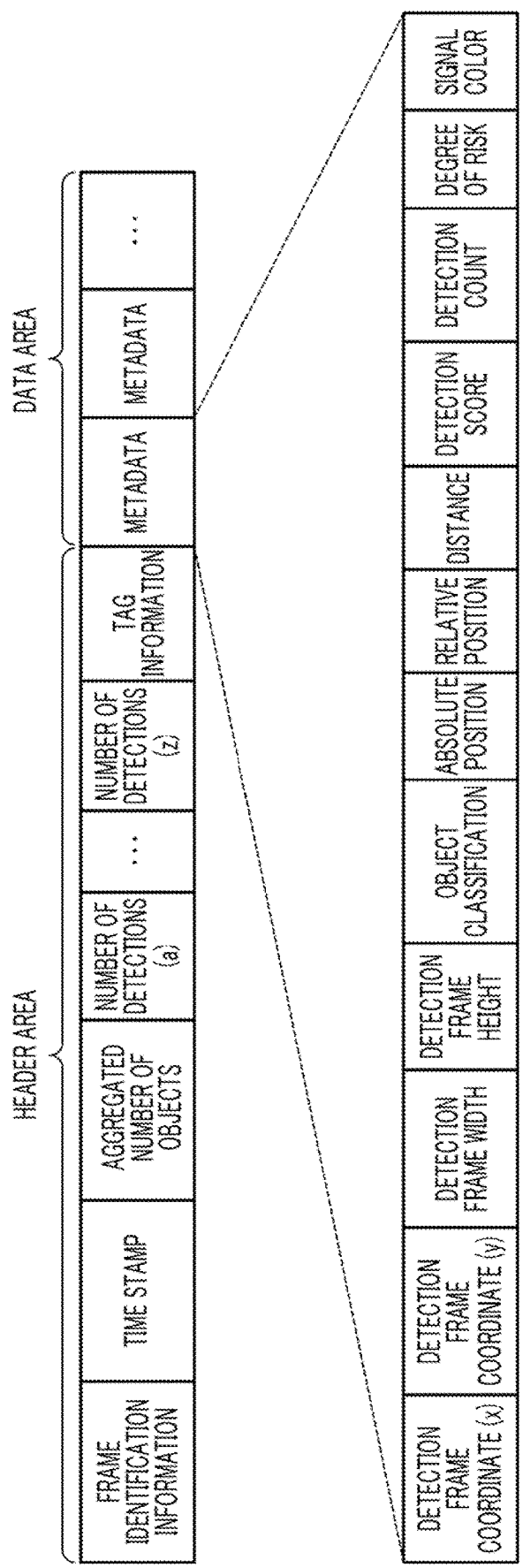
FIG. 4 is a diagram showing a data structure of log data.

FIG. 4 shows the data structure of the log data. As shown in FIG. 4, each record of the log data includes a header area and a data area. The header area includes frame identification information, a time stamp, the aggregated number of objects, each number of detections, and tag information. The data area includes metadata. The frame identification information is information for uniquely specifying an image frame in the system. The time stamp is date and time information on which the image frame is generated.

In an example of FIG. 4, the classifications of the objects to be detected are 26 types of a to z. The number of detections (a) to the number of detections (z) in FIG. 4 represent the number of detections of the objects of the object classifications a to z, respectively. The number of classifications of the objects to be detected is not limited to 26, and may be less than 26 or may be greater than 26. The tag information is optional information related to the image frame, and includes, for example, angle information, pedestrian and the like crossing information, and brightness information. The angle information indicates an angle between a lane and the vehicle 10 detected through the image recognition processing. The pedestrian and the like crossing information is information indicating that a pedestrian, a bicycle, or the like is detected on a traveling lane. The brightness information is information related to brightness in front of the vehicle to be determined from the image frame. The tag information may include the positional information of the vehicle 10 output from the positional information acquisition unit 123. The tag information is added to the record corresponding to the image frame, whereby it is possible to perform a conditional search of the log data with a tag.

Figure 5:
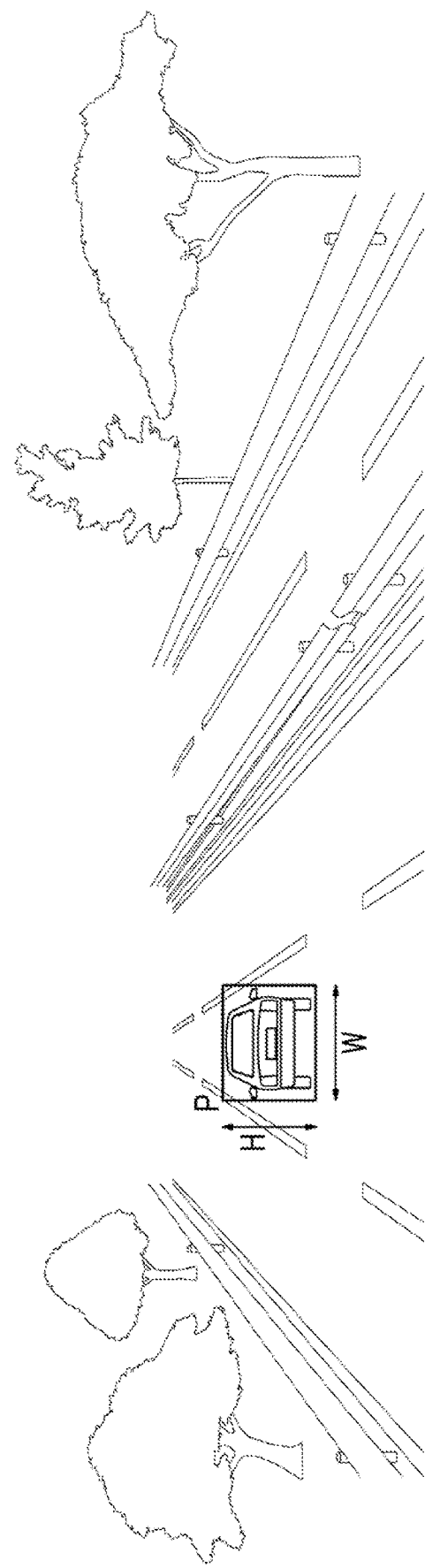
FIG. 5 is a conceptual diagram showing a mode of image recognition processing.

The data area of each record includes metadata of each of all objects detected through the image recognition processing. The metadata includes a detection frame coordinate (x), a detection frame coordinate (y), a detection frame width, a detection frame height, an object classification, an absolute position, a relative position, a distance, a detection score, a detection count, a degree of risk, and a signal color. The detection frame coordinate (x) and the detection frame coordinate (y) are reference coordinates of a rectangular detection frame including the detected object. FIG. 5 shows a detection frame in a case where an object is detected in a captured image frame. In FIG. 5, an automobile is detected. For example, an x coordinate and a y coordinate of an upper left vertex P of the detection frame shown in FIG. 5 may be the detection frame coordinate (x) and the detection frame coordinate (y), respectively. A position and a size of the detection frame are specified by the coordinates of the vertex P, a detection frame width W, and a detection frame height H.

The object classification indicates the type of an object, and Table 1 shows an example of the object classification.

TABLE 1

| Object Classification ID | Object Classification |
| --- | --- |
| 0 | Pedestrian |
| 1 | Bicycle |
| 2 | Motorcycle |
| 3 | Automobile |
| ... | ... |
| 7 | Traffic Sign |
| ... | ... |
| 10 | Falling Object |
| 11 | Road Cone |
| 12 | Construction Site |
| 13 | Traffic Signal |
| 14 | Traffic Signal (Arrow) |
| 15 | Signboard (Sign) |
| 16 | Signboard (Price) |
| 17 | Face (for Privacy Mask) |
| 18 | Number Plate (for Privacy Mask) |
| ... | ... |

The absolute position and the relative position are information indicating a position of an object based on a traveling lane of the vehicle. The absolute position specifies respective lanes in a road having six lanes in both directions by values of 1 to 6 from a traveling lane at a left end to a traveling lane at a right end. The relative position sets the traveling lane, on which the vehicle 10 is present, to zero, represents a traveling lane on a right side by a positive number, and represents a traveling lane of a left side by a negative number.

The distance represents a direct distance to the detected object. The detection score is a value indicating a degree of confidence of the image recognition processing. When the detection score is higher, a detection result of the image recognition processing is probable. The detection count is the number of detections when the same target is detected in a plurality of coordinates.

The degree of risk is determined based on, for example, the following criterion.

(i) In a case where another vehicle is detected on the traveling lane of the host vehicle, the degree of risk is determined in four stages (0 to 3) based on a relative speed (at the time of approach) and an inter-vehicle distance.

(ii) In a case where a pedestrian or a bicycle is detected on any traveling lane, the degree of risk is determined in four stages (0 to 3) based on the distance between the pedestrian or the bicycle and the host vehicle.

(iii) Otherwise, the degree of risk is set to a predetermined value (for example, "−1").

The signal color indicates a detected lamp color of a traffic signal with a numerical value, and is determined based on, for example, Table 2. In a case where the detected object is other than a traffic signal, the signal color is set to a predetermined value (for example, "−1").

TABLE 2

| Lamp Color | Value |
|---|---|
| Green | 0 |
| Yellow | 1 |
| Red | 2 |
| Unclear | 3 |

Figure 6:
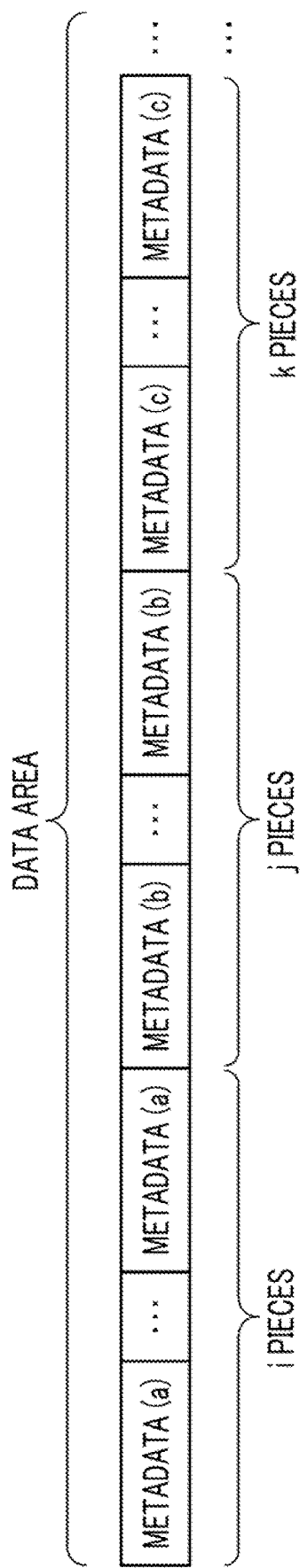
FIG. 6 is a diagram showing a data structure of a data area of log data.

FIG. 6 is a diagram showing the structure of the data area of the log data. As shown in FIG. 6, metadata related to all detected objects is stored in the data area. The data area is an area having a variable length, and the metadata for the aggregated number of objects is stored in the data area.

The metadata is arranged following the values and the sequence of the number of detections (a) to the number of detections (z) included in the header area of the record. In other words, the structure of the data area is determined based on each number of detections and the sequence of each number of detections included in the header area. For example, in a case where the objects of the object classifications a, b, c are detected by i, j, and k pieces, respectively, as shown in FIG. 6, i pieces of metadata of the object classification a are continued, and subsequently, j pieces of metadata of the object classification b are continued. In addition, k pieces of metadata of the object classification c are continued subsequently.

As a comparative example of the data structure of the data area, a case where the data area is set to a fixed length and a storage area of metadata of each object classification is sufficiently secured in advance is considered. In a case where the structure of the comparative example is employed, the structure of the data area can be formed in a simple format; however, an area for storing metadata should be sufficiently secured. Furthermore, since data is set to a fixed length, a default value (for example, 0) needs to be stored in the storage area of the metadata. For this reason, the data size is the same regardless of the number of objects to be detected, and wasteful data is included. According to the embodiment, since the data area of the log data is set to a variable length, and solely the metadata for the number of objects to be detected is included, it is possible to suppress an increase in data size of the log data. With the use of information of each number of detections, it is possible to easily specify an object classification and a portion of the data area of the log data where the metadata of the object classification is present.

The sequence of each number of detections of the object classifications a to z is determined based on, for example, at least one of a recognition frequency and a detection score of each object. With this, the sequence of the metadata to be stored in the data area is determined. That is, the sequence of the metadata is determined based on at least one of the recognition frequency and the detection score of each object. For example, the metadata may be arranged in order from an object classification for which an average value of a recognition frequency of an object is high. In this case, the metadata of the objects for which the average value of the recognition frequency is high is present ahead (in FIG. 6, the left side). In this way, in a case where scanning is performed from the left side of the record in the search processing of the log data, it is possible to improve a search speed for an object for which a recognition frequency is high.

For example, the metadata may be arranged in order from an object classification for which an average value of a detection score of an object is high. In this case, the metadata of the object for which the average value of the detection score is high is present ahead (in FIG. 6, the left side). In this way, in a case where scanning is performed from the left side of the record in the search processing of the log data, it is possible to improve a search speed for an object for which a detection score is high.

The sequence of the metadata may be determined based on a search frequency of an object, and for example, the metadata may be arranged in order from an object for which a search frequency is high. In this way, in a case where scanning is performed from the left side of the record in the search processing of the log data, it is possible to improve a search speed for an object for which a search frequency is high.

Figure 7:
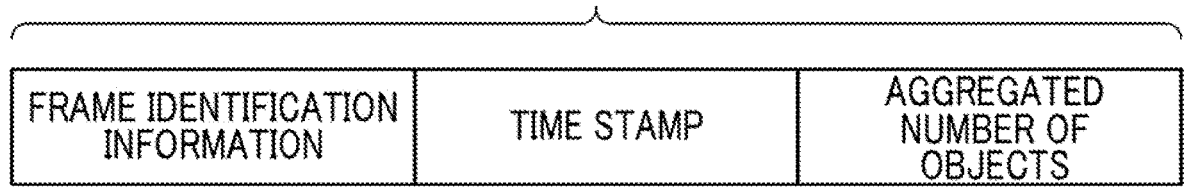
FIG. 7 is a diagram showing a data structure of log data in a case where the aggregated number of objects is zero.

The controller 126 does not add the total number (the number of detections) of the objects for each object classification and the metadata to the log data in a case where the aggregated number of objects is zero. FIG. 7 shows a data structure of log data in a case where the aggregated number of objects is zero. As shown in FIG. 7, the log data includes the frame identification number, the time stamp, and the aggregated number of objects, but does not include the total number of objects for each object and the metadata. In other words, in a case where the aggregated number of objects is zero, the record of the log data does not have the data area.

As a comparative example, a case where both of the header area and the data area of the log data is set to a fixed length is considered. In this case, when the aggregated number of objects is zero, the total number of objects for each object is zero. In the data area, a default value (for example, zero) is arranged. With the data structure of the log data according to the embodiment, it is possible to omit useless information compared to the comparative example, and to suppress an increase in data size of the log data.

FIG. 8 shows an example of log data generated by the information processing device 12. Fields A to C of the log data of FIG. 8 are the frame identification information, the time stamp, and the aggregated number of objects, respectively. Each of fields D to I is the number of detections of each object classification, and here, an example where the number of types of objects to be detected is six is shown. Specifically, the fields D to I are the number of detections of automobiles, the number of detections of pedestrians and bicycles, the number of detections of motorcycles, the number of detections of construction sites, and the number of detections of falling objects, and the number of detections of traffic signals. Fields J to L are the tag information, and are the angle information, the pedestrian and the like crossing information, and the bright information, respectively. Fields M to X are metadata related to a first object detected in each image frame. Specifically, the fields M to X are the detection frame coordinate (x), the detection frame coordinate (y), the detection frame width, the detection frame height, the object classification, the absolute position, the relative position, the distance, the detection score, the detection count, the degree of risk, and the signal color. A field Y and subsequent fields are metadata related to second and subsequent objects.

As shown in FIG. 8, in first to fourth and sixth records, since the aggregated number of objects is equal to or greater than one, the total number of objects for each object classification and metadata related to each object are included. In a fifth record, since the aggregated number of objects is zero, the total number (the number of detections) of objects for each object classification and metadata are not included. In other words, among the records of FIG. 8, the record in which the aggregated number of objects is zero has data solely in the fields A to C, and does not have data in the field D and subsequent fields. In the fourth record, the aggregated number of objects is one. For this reason, the fourth record has solely one piece of metadata, and has data solely in the fields A to X. In this way, it is possible to suppress an increase in data size of the log data.

Generation Operation of Log Data

Figure 9:
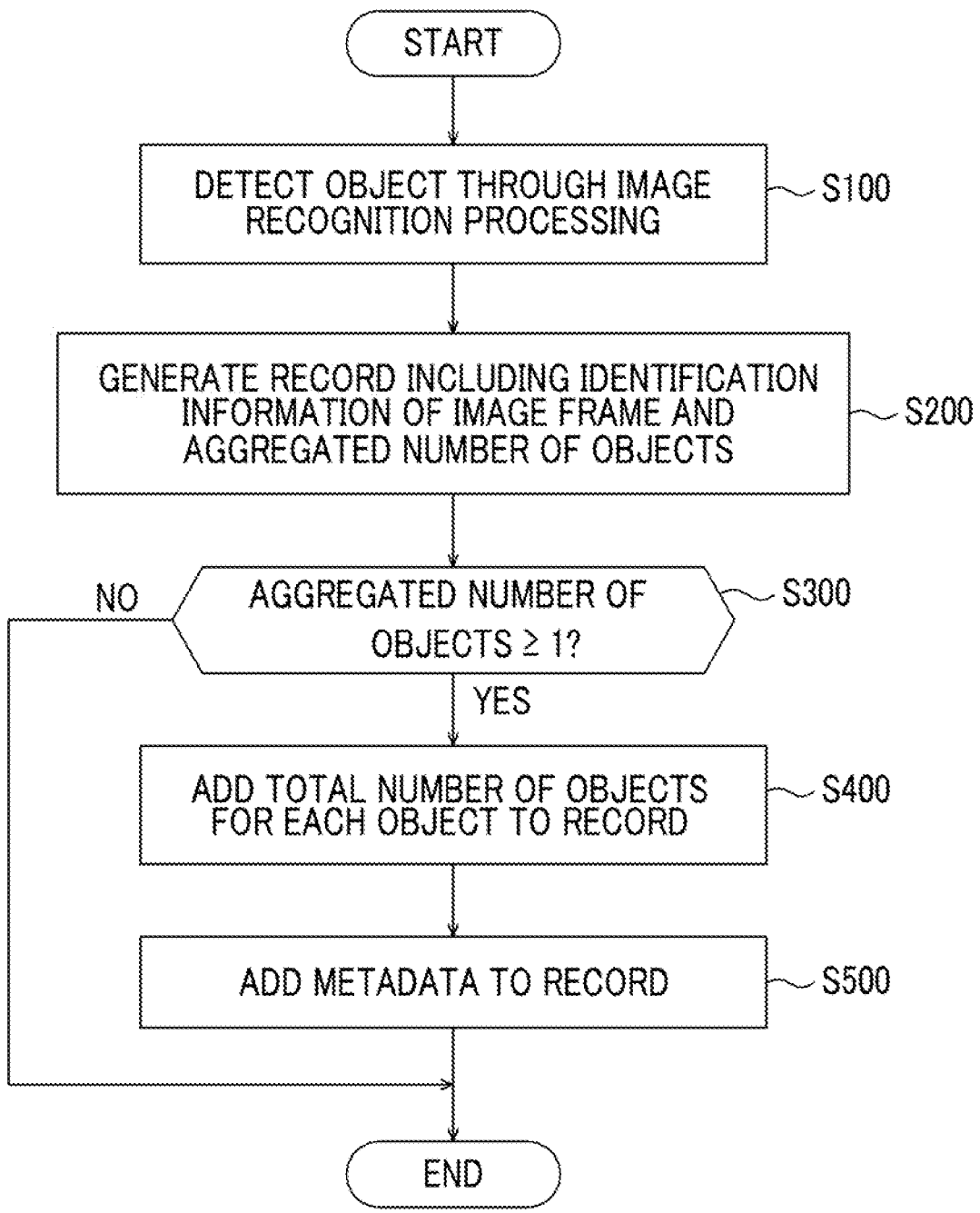
FIG. 9 is a flowchart showing a generation operation of log data in the information processing system according to the embodiment of the disclosure.

A generation operation of log data will be described referring to a flowchart of FIG. 9. In FIG. 9, an operation to generate log data based on one image frame is shown. The operation is performed on each of a plurality of image frames.

Step S100: The controller 126 of the information processing device 12 detects objects in each image frame through the image recognition processing on the image frames.

Step S200: The controller 126 generates a record including the identification information of each the image frame and the aggregated number of objects detected in the corresponding image frame.

Step S300: The controller 126 determines whether or not the aggregated number of objects is equal to or greater than one. In a case where the aggregated number of objects is equal to or greater than one, the process progresses to Step S400. In a case where the aggregated number of objects is not equal to or greater than one, Step S400 is skipped, and the process ends.

Step S400: The controller 126 adds the total number of objects for each object classification to the corresponding record.

Step S500: The controller 126 adds the metadata related to each object to the corresponding record. Then, the process ends.

As described above, in the information processing system 1 according to the embodiment, each record of the log data includes information of the aggregated number of objects detected in each image frame. In a case where the aggregated number of objects is equal to or greater than one, the total number of objects (each number of detections) for each object classification and the metadata related to each object are added to the log data. In a case where the aggregated number of objects is zero, each number of detections and the metadata are not added to the log data. In a case where the aggregated number of objects is zero, the total number of objects for each object is zero. In this case, since there is no detected object, the metadata does not need to be added. With the information processing system 1 according to the embodiment, in a case where the aggregated number of objects is zero, unneeded data is not added to the record, and it is possible to suppress an increase in data size of the log data. An increase in data size of the log data to be searched is suppressed, whereby a search speed is improved, and it is possible to improve an information search technique of the log data.

In the information processing system 1 according to the embodiment, each record of the log data includes information of each number of detections, and the sequence of the metadata in the data area of each record is determined based on each number of detections. With this, it is possible to set the data area of the log data to a variable length, and to suppress an increase in data size of the log data. With the use of information of each number of detections, it is possible to specify a portion of the data area of the log data where needed metadata is present. Accordingly, with information of each number of detections, for example, it is possible to limit the data area to be scanned, and to improve an information search technique of the log data.

Although the disclosure has been described based on the drawings and the example, it should be noted that those skilled in the art can easily make various modifications and corrections based on the disclosure. Accordingly, it should be noted that such modifications and corrections are included in the scope of the disclosure. For example, the functions and the like included in respective means or respective steps can be rearranged as long as there is no logical contradiction, and two or more means or steps may be combined into single means or step or may be divided.

A configuration in which, for example, a general-purpose information processing device, such as a smartphone or a computer, is made to function as the communication device 11, the information processing device 12, the imaging device 13, or the server 20 according to the above-described embodiment may be made. Specifically, a program, in which processing contents for implementing the function of the communication device 11 and the like according to the embodiment are described, is stored in a memory of the information processing device, and a processor of the information processing device is made to read and execute the program. Accordingly, the disclosure according to the embodiment can also be implemented as a program to be executable by the processor.

For example, in the above-described embodiment, a part of processing operations to be performed in the vehicle 10 may be performed in the server 20, and a part of processing operations to be performed in the server 20 may be performed in the vehicle 10. Specifically, for example, a configuration in which an image processing operation is performed by the server 20 may be made.

In the above-described embodiment, although an example where the metadata in the log data is arranged following the sequence of the number of detections (a) to the number of detections (z) of the record has been described, the sequence may be replaced. For example, the server 20 may change the sequence of the metadata in the log data in the predetermined period based on at least one of the recognition frequency and the detection score of each object in the predetermined period. Information of the sequence may be recorded in the sequence table such that the sequence of the metadata can be specified at the time of search processing.

FIG. 10 shows an example of a sequence table. The sequence table is stored in the server storage unit 22 of the server 20. As shown in FIG. 10, the sequence table includes information related to a range of a frame identification number and an arrangement sequence of objects. In the records included in the range of the frame identification number, the metadata is arranged along information related to the arrangement sequence of the corresponding objects. For example, in the record related to the image frame having the frame identification number of 00000001, the metadata is arranged along a sequence of No. 1 of the sequence table. For example, in the record related to the image frame having the frame identification number of 00100001, the metadata is arranged along a sequence of No. 2 of the sequence table. In the sequence of No. 2 of the sequence table, the sequences of c and d are replaced compared to the sequence of No. 1. In a sequence of No. 3 of the sequence table, the sequences of a and b are replaced compared to the sequence of No. 2. In this way, the sequence of metadata is changed based on at least one of the recognition frequency and the detection score in the predetermined period, whereby it is possible to improve a search speed.

The tag information included in the log data may be optimized. For example, the server controller 23 of the server 20 measures a search speed of the log data with a predetermined search query based on the tag information, and in a case where the search speed is lower than a predetermined value, may perform change by merging or subdividing the tag information. The server controller 23 of the server 20 changes the tag information such that the search speed becomes equal to or higher than the predetermined value. In this way, the search speed of the log data is evaluated using the predetermined search query and the tag information is changed, thereby improving a search speed of the log data.

In the above-described embodiment, although an example where all objects to be detected are detected through the image recognition processing has been described, the disclosure is not limited thereto. For example, the information processing device 12 may omit detection of a part of objects based on a result of the image recognition processing. For example, specifically, at least a part of object classifications to be detected may be hierarchized, and solely in a case where a detection score of image recognition processing related to a higher hierarchical object classification is equal to or greater than a predetermined value, image recognition processing related to a lower hierarchical object classification of the object classifications may be executed. FIG. 11 is a conceptual diagram representing the hierarchical relationship between object classifications to be detected. An object classification X is a higher hierarchical object classification (for example, vehicle), and object classifications A to C (for example, heavy vehicle, medium vehicle, and compact vehicle) are included directly below the object classification X. Object classifications a, a' (for example, truck and bus) are included in a lower hierarchy of the object classification A, and object classifications b, b' are included in a lower hierarchy of the object classification B. For example, in a case where a detection score related to the object classification A is equal to or greater than a predetermined value, detection related to the object classifications a, a' in the lower hierarchy of the object classification A is performed. In a case where a detection score related to the object classification A is less than the predetermined value, detection related to the object classifications a, a' in the lower hierarchy of the object classification A is not performed. In this way, it is possible to omit detection of an object classification for which a detection score is low, and the metadata related to the object classification is not included in the log data. For this reason, it is possible to suppress an increase in data size of the log data, and to increase a speed of search of the log data. In regard to an object classification for which a detection score is high, since image recognition processing of lower hierarchical subdivided object classifications is executed, and the metadata related to the object classifications is included in the log data, it is possible to perform more subdivided search.

What is claimed is:

1. A method of generating log data that includes a plurality of records, in which information detected through image recognition processing on a plurality of image frames is recorded, the method comprising:
   detecting objects in each of the image frames through the image recognition processing;
   generating a record including a total number of objects detected in each of the image frames; and
   adding metadata related to the detected objects to a corresponding record when the total number of objects is equal to or greater than one, wherein when the total number of objects is zero, the metadata related to the detected objects is not added to the record.

2. The method according to claim 1, further comprising adding the total number of objects for each object classification to the corresponding record when the total number of objects is equal to or greater than one.

3. The method according to claim 1, wherein a sequence of metadata in the log data is determined based on at least one of a recognition frequency and a detection score of each object.

4. The method according to claim 1, further comprising:
   changing a sequence of metadata in the log data in a predetermined period based on at least one of a recognition frequency and a detection score of each object in the predetermined period; and
   recording information of the sequence in a sequence table.

5. The method according to claim 1, further comprising:
   measuring a search speed of the log data with a predetermined search query based on tag information included in the log data; and
   changing the tag information when the search speed is lower than a predetermined value.

6. The method according to claim 1, wherein:
   at least a part of object classifications is hierarchized; and
   solely when a detection score of image recognition processing related to a higher hierarchical object classification is equal to or greater than a predetermined value, image recognition processing related to a lower hierarchical object classification of the higher hierarchical object classifications is executed.

7. A non-transitory computer-readable medium storing a program that causes a computer functioning as an information processing device configured to generate log data including a plurality of records, in which information detected through image recognition processing on a plurality of image frames is recorded, to execute processing, the processing comprising:
   detecting objects in each of the image frames through the image recognition processing;
   generating a record including a total number of objects detected in each of the image frames; and
   adding metadata related to the detected objects to a corresponding record when the total number of objects is equal to or greater than one, wherein when the total number of objects is zero, the metadata related to the detected objects is not added to the record.

8. The non-transitory computer-readable medium according to claim 7, further comprising adding the total number of objects for each object classification to the corresponding record when the total number of objects is equal to or greater than one.

9. The non-transitory computer-readable medium according to claim 7, wherein a sequence of metadata in the log data is determined based on at least one of a recognition frequency and a detection score of each object.

10. The non-transitory computer-readable medium according to claim 7, further comprising:
    changing a sequence of metadata in the log data in a predetermined period based on at least one of a recognition frequency and a detection score of each object in the predetermined period; and
    recording information of the sequence in a sequence table.

11. The non-transitory computer-readable medium according to claim 7, further comprising:
    measuring a search speed of the log data with a predetermined search query based on tag information included in the log data; and changing the tag information when the search speed is lower than a predetermined value.

12. The non-transitory computer-readable medium according to claim 7, wherein:
at least a part of object classifications is hierarchized; and
solely when a detection score of image recognition processing related to a higher hierarchical object classification is equal to or greater than a predetermined value, image recognition processing related to a lower hierarchical object classification of the higher hierarchical object classifications is executed.

13. A data structure of log data including information detected through image recognition processing on a plurality of image frames, the data structure comprising a plurality of records corresponding to the image frame, wherein:
each record includes a total number of objects detected in each of the image frames; and
a record in which the total number of objects is equal to or greater than one includes metadata related to the detected objects, and a record in which the total number of objects is zero includes no metadata.

14. The data structure according to claim 13, wherein the total number of objects for each object classification is added to the corresponding record when the total number of objects is equal to or greater than one.

15. The data structure according to claim 13, wherein a sequence of metadata in the log data is determined based on at least one of a recognition frequency and a detection score of each object.

16. The data structure according to claim 13, wherein:
a sequence of metadata in the log data in a predetermined period is changed based on at least one of a recognition frequency and a detection score of each object in the predetermined period; and
information of the sequence is recorded in a sequence table.

17. The data structure according to claim 13, wherein:
a search speed of the log data with a predetermined search query is measured based on tag information included in the log data; and
the tag information is changed when the search speed is lower than a predetermined value.

18. The data structure according to claim 13, wherein:
at least a part of object classifications is hierarchized; and
solely when a detection score of image recognition processing related to a higher hierarchical object classification is equal to or greater than a predetermined value, image recognition processing related to a lower hierarchical object classification of the higher hierarchical object classifications is executed.

19. A data structure of log data that is used in an information processing system including a vehicle and a server, and includes information detected through image recognition processing on a plurality of image frames, the data structure comprising a plurality of records corresponding to the image frame, wherein:
each record includes a total number of objects detected in each of the image frames; and
the vehicle adds metadata related to the detected objects to a corresponding record when the total number of objects is equal to or greater than one and adds no metadata when the total number of objects is zero.

20. The data structure according to claim 19, wherein the total number of objects for each object classification is added to the corresponding record when the total number of objects is equal to or greater than one.

* * * * *